United States Patent
Gao et al.

(10) Patent No.: US 9,164,798 B2
(45) Date of Patent: Oct. 20, 2015

(54) METHOD, APPARATUS AND COMPUTER FOR LOADING RESOURCE FILE FOR GAME ENGINE

(71) Applicant: MStar Semiconductor, Inc., Hsinchu Hsien (TW)

(72) Inventors: Lu Gao, Hsinchu County (TW); Hu He, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 213 days.

(21) Appl. No.: 13/947,260

(22) Filed: Jul. 22, 2013

(65) Prior Publication Data

US 2014/0033219 A1 Jan. 30, 2014

(30) Foreign Application Priority Data

Jul. 24, 2012 (CN) .......................... 2012 1 0258590

(51) Int. Cl.
*G06F 9/46* (2006.01)
*G06F 9/50* (2006.01)
*G06F 9/445* (2006.01)

(52) U.S. Cl.
CPC .............. *G06F 9/50* (2013.01); *G06F 9/44521* (2013.01); *G06F 9/5011* (2013.01); *G06F 9/5016* (2013.01); *G06F 9/5038* (2013.01); *G06F 2209/5017* (2013.01); *G06F 2209/5018* (2013.01)

(58) Field of Classification Search
CPC ............................ G06F 9/5016; G06F 9/5011
See application file for complete search history.

(56) References Cited

U.S. PATENT DOCUMENTS 7,895,164 B1 * 2/2011 Varadarajan et al. .......... 707/649
2005/0122334 A1 * 6/2005 Boyd et al. .................... 345/520

FOREIGN PATENT DOCUMENTS

| CN | 101706719 | 5/2010 |
| TW | 200905608 | 2/2009 |

OTHER PUBLICATIONS

Taiwan Intellectual Property Office, "Office Action", May 21, 2014.

* cited by examiner

*Primary Examiner* — Camquy Truong
(74) *Attorney, Agent, or Firm* — WPAT, PC; Justin King

(57) ABSTRACT

A method for loading a resource file for a game engine is provided. The method includes: activating a thread to a preload a predetermined resource file, wherein the predetermined resource file includes a texture resource file, and one or both of a structure resource file and a model resource file; and accessing and loading one or both of the structure resource file and the model resource file through memory mapping. The provided method increases a loading speed while loading a game resource file and fully utilizes computer resources.

15 Claims, 6 Drawing Sheets

METHOD, APPARATUS AND COMPUTER FOR LOADING RESOURCE FILE FOR GAME ENGINE

This application claims the benefit of People's Republic of China application Serial No. 201210258590.9, filed Jul. 24, 2012, the subject matter of which is incorporated herein by reference.

BACKGROUND OF THE INVENTION

1. Field of the Invention

The invention relates to a method, apparatus and computer for loading a resource file for a game engine.

2. Description of the Related Art

Computer games are an entertainment that progressively gains popularity. To satisfy people's needs and provide better game experiences, designs of computer games are also becoming more and more diversified.

For computer games whether executed by a computer or an embedded product, designs of the computer games are getting increasingly sophisticated. To achieve realistic game effects, resources utilized by computer games, such as texture, models, and game scripts, are also becoming more and more colossal and complex.

Colossal and complex resource files are an inevitable price paid for achieving realistic game effects. However, documents in sizes of gigabytes lead to a series of issues including slow speeds in activating games, switching between scenes and loading checkpoints. These issues directly degrade an operation speed and efficiency of a computer while also causing resource wastage.

SUMMARY OF THE INVENTION

The invention is directed to a method, apparatus, and computer executed process for loading a resource file for a game engine to increase a speed of loading game resources and to fully utilize computer resources.

According to an aspect of the present invention, a method for loading a resource file for a game engine is provided. The method includes steps of: activating a thread to preload a predetermined resource file, wherein the predetermined resource file includes a texture resource file, and one or both of a structure resource file and a model resource file; and accessing and loading the structure resource file and/or the model resource file through memory mapping.

The step of accessing and loading one or both of the structure resource file and the model resource file through memory mapping includes: accessing a header of one or both of the structure resource file and the model resource file to obtain a predetermined address of a plurality of structs in one or both of the structure resource file and the model resource file, wherein the structs are obtained from dividing one or both of the structure resource file and the model resource file and has a consistent recording method as the game engine records corresponding resources in a memory; mapping one or both of the structure resource file and/or the model resource file including the structs to the predetermined address; accessing all of one or both of the structs in the structure resource file and the model resource file after having mapped to the predetermined address; and cancelling the mapping relationship between one or both of the structure resource file and the model resource file including the structs and the predetermined address after having accessed all of the structs in one or both of the structure resource file and the model resource file to complete loading one or both of the structure resource file and the model resource file.

The above method further includes: determining whether the header of one or both of the structure resource file and the model resource file is accessed for the first time; if the header is not accessed for the first time, the step of accessing the header of one or both of the structure resource file and the model resource file and subsequent steps are performed till having completely loaded one or both of the structure resource file and the model resource file; if the header is accessed for the first time, dividing one or both of the structure resource file and the model resource file into structs, wherein the structs have a consistent recording method as the game engine records the corresponding resources in the memory; mapping one or both of the structure resource file and the model resource file including the structs to the predetermined address in the memory, such that a starting address of each of the structs in one or both of the structure resource file and the model resource file is a sum of a location shift value of the struct in one or both of the structure resource file and the model resource file and the predetermined address; searching for one other address if the predetermined address is occupied, such that the starting address of each corresponding struct is a sum of the location shift value of the struct in one or both of the structure resource file and the model resource file and the one other address; writing the predetermined address and the location shift value of each of the structs in one or both of the structure resource file and the model resource file back to a corresponding pointer; and cancelling the mapping relationship between one or both of the structure resource file and the model resource file and the predetermined address in the memory after having written the pointers of all of the structs to complete loading the structure resource file and/or the model resource file.

The above method further includes: simultaneously activating multiple threads for non-synchronous loading of scene reorganization, shader compiling, and the texture resource file.

The step of simultaneously activating the threads for the non-synchronous loading of the texture resource file includes: simultaneously activating the threads to establish multiple corresponding shared contexts; accessing the texture resource file to the shared contexts; decoding the texture resource file through a decoder to obtain a 2D texture object in a display-dedicated memory; automatically generating a mipmap according to the 2D texture object from the display-dedicated memory; and completing the non-synchronous loading of the texture resource file.

The step of accessing the texture resource to the shared contexts includes: simultaneously accessing at least two texture resource files to the shared contexts, wherein each of the shared contexts corresponds to one of the texture resource files, and the resource files include compressed texture information that can be directly utilized by a 3D hardware device.

The step of decoding the texture resource file through the decoder to obtain the 2D texture object in the display-dedicated memory includes: determining whether a hardware decoder is idle; decoding the texture resource file through the hardware decoder when the hardware decoder is idle to obtain the 2D object in the display-dedicated memory; and decoding the texture resource file through a software decoder when the hardware decoder is not idle to obtain the 2D object in the display-dedicated memory.

The step of activating the thread to preload the predetermined resource file includes: activating the thread to preload the predetermined resource file to a page cache, and simultaneously initializing a CPU to accelerate a speed of the scene reorganization and shader compiling.

The step of initializing the CPU to accelerate the speed of the scene reorganization and shader compiling includes: rendering the CPU to load a dynamic library, initialize a background service, establish a scene, and loading resources at another location, including but not limited to the Internet, to accelerate the speed of loading the scenes and shader compiling.

The step of performing shader compiling includes: completing shader compiling in an offline status before software publish and storing the compiled shader to the structure resource file.

According to another aspect of the present invention, an apparatus for loading a resource file is provided. The apparatus includes: a preloading module, for preloading a predetermined resource file by activating a thread, wherein the predetermined resource file includes a texture resource file, and one or both of a structure resource file and a model resource file; and a first loading module, for accessing and loading one or both of the structure resource file and the model resource file preloaded by the preloading module through memory mapping.

The first preloading module includes: a first accessing unit, for accessing a header of one or both of the structure resource file and the model resource file preloaded by the preloading module to obtain a predetermined address of a plurality of structs in one or both of the structure resource file and the model resource file, wherein the structs are obtained from dividing one or both of the structure resource file and the model resource file and have a consistent recording method as the game engine records corresponding resources in a memory; a first file mapping unit, for mapping one or both of the structure resource file and the model resource file including the structs to the predetermined address obtained by the first accessing unit; a second accessing unit, for accessing all of the structs in one or both of the structure resource file and the model resource file after the first file mapping unit completes mapping; and a first loading unit, for cancelling the mapping relationship between one or both of the structure resource file and the model resource file including the structs and the predetermined address after having accessed all of the structs in one or both of the structure resource file and the model resource file to complete loading one or both of the structure resource file and the model resource file.

The first loading module includes: a determining unit, for determining whether the header of one or both of the structure resource file and the model resource file is accessed for the first time, and outputting a determination result; a file dividing unit, for dividing one or both of the structure resource file and the model resource file into structs when the determination result indicates that the header of the structure resource file and/or the model resource file is accessed for the first time, wherein the structs have a consistent recording method as the game engine records the corresponding resources in the memory; a second file mapping unit, for mapping one or both of the structure resource file and the model resource file including the divided structs obtained by the file dividing unit to the predetermined address in the memory, and obtaining a starting address of each of the structs in one or both of the structure resource file and the model resource file, such that the starting address of each of the structs in one or both of the structure resource file and the model resource file is a sum of a location shift value of the struct in one or both of the structure resource file and the model resource file and the predetermined address; a pointer editing unit, for writing the sum of the predetermined address and the location shift value of each of the structs in one or both of the structure resource file and the model resource file back to a pointer of the corresponding struct; and a second loading unit, for cancelling the mapping relationship between one or both of the structure resource file and the model resource file including the structs and the predetermined addresses in the memory after having written the pointers of all of the structs to complete loading one or both of the structure resource file and the model resource file.

The above apparatus further includes: a second loading module, for simultaneously activating multiple threads for non-synchronous loading of scene reorganization, shader compiling, and the texture resource file after the first loading module completes loading.

The second loading module includes: a platform establishing unit, for simultaneously activating the threads to establish multiple corresponding shared contexts; a third accessing unit, for accessing the texture resource file to the shared contexts; a decoding unit, for decoding the texture resource file through a decoder to obtain a 2D texture object in a display-dedicated memory; and a third loading unit, for automatically generating a mipmap according to the 2D texture object from the display-dedicated memory to complete the non-synchronous loading of the texture resource file.

The third accessing unit accesses at least two texture files to the shared contexts, wherein each of the shared contexts corresponds to one of the texture resource files.

More specifically, the preloading module activates the thread to preload the predetermined resource file to a page cache, and simultaneously initializes a CPU to accelerate a speed of the scene reorganization and shader compiling.

According to yet another aspect of the present invention, a loading apparatus including the above resource file is provided.

Thus, the above method, apparatus, and loading apparatus disclosed by the present invention are capable of accelerating read/write performance of a file system through preloading. Further, through memory mapping employed by a resource file, a speed of accessing files is accelerated. By combining the two approaches above, all resources of software and hardware systems are fully utilized during a loading process, thereby significantly enhancing a speed of loading game resource files and thoroughly exercising computer resources.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
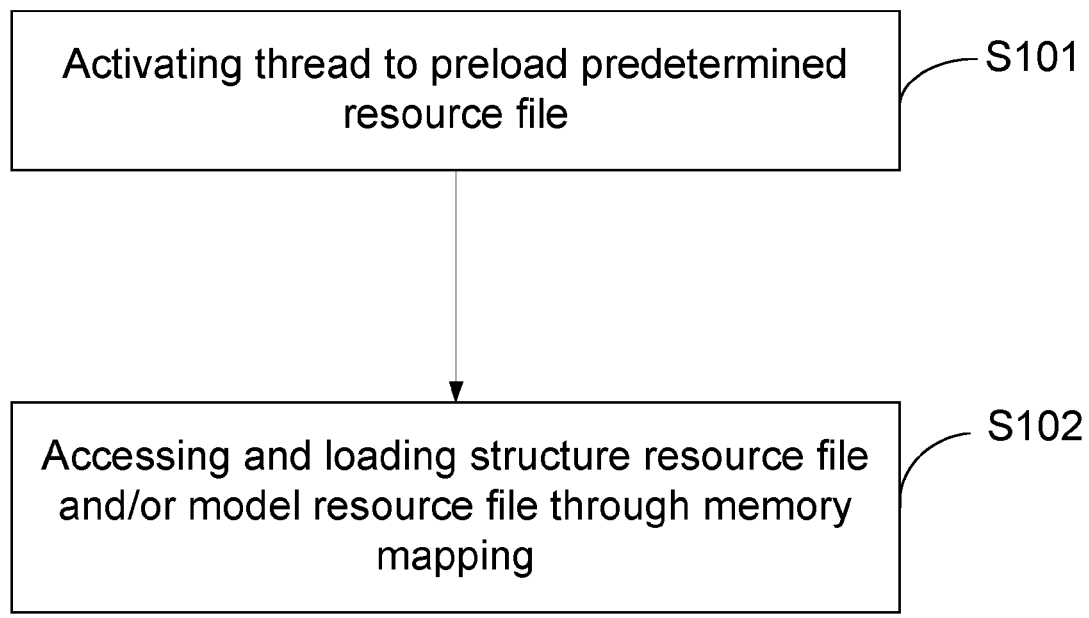
FIG. 1 is a flowchart of a method for loading a resource file for a game engine according to an embodiment of the present invention.

Referring to FIG. 1, a method for loading a resource file for a game engine according to an embodiment of the present invention includes the following steps.

In step S101, a thread is activated to preload a predetermined resource file.

In an embodiment of the invention, a structure resource file refers to a resource file for descriptions on 3D scenes, a shader employed for rendering, and an execution script of a game/user interface (UI). Such types of resource files have a rather sophisticated structure, and although not being sizable in volume, they require complex algorithms for analysis when being loaded. Thus, a loading process of such types of resource files are accompanied by a significant burden upon a CPU.

A texture resource file refers to a resource file containing substance textures, which are generally image files. Texture resource files usually have a large volume, and involve a lengthy file system loading process when being loaded, a hardware/software decoding process, and sometimes even a process for automatically generating a mipmap by a graphics processing engine (GPU).

A model resource file refers to all resource files containing 3D models of objects. Such types of files typically have a volume between those of the structure resource files and texture resource files. A process for loading such type of files chiefly requires accessing files and copying memory segments.

A thread is first activated to sequentially preload a predetermined resource file. The predetermined resource file includes a texture resource file and a structure resource file and/or a model resource file.

During an overall loading process, a huge amount of reading/writing operations are involved for both structure resource files and texture resource files. Thus, through the use of preloading, some resources files can be strategically placed into a memory in advance for rapid access.

Taking a Linux system for example, a Linux system file has a page cache. By preloading resource files once, contents of the resource file then exist in the page cache such that an access speed for a second file access process can be noticeably increased to accelerate the loading process. While preloading, the CPU may be prompted to perform an initialization process such as loading a dynamic library, initializing background services, constructing scenes, and loading resources at another location, including but not limited to, the Internet. Thus, subsequent scene organization and shader compiling is preempted in order to accelerate the loading speed.

In step S102, at least one of the structure resource file and the model resource files is accessed and loaded through memory mapping.

As structure resource files and model resource files do not generally have a gigantic volume, these resource files do not typically need to be compressed. Through memory mapping, accessing at least one of the structure resource file and the model resource file is made identical to directly accessing data in a memory, thereby eliminating a file analysis process, thereby accelerating the speed of loading these files.

Figure 2:
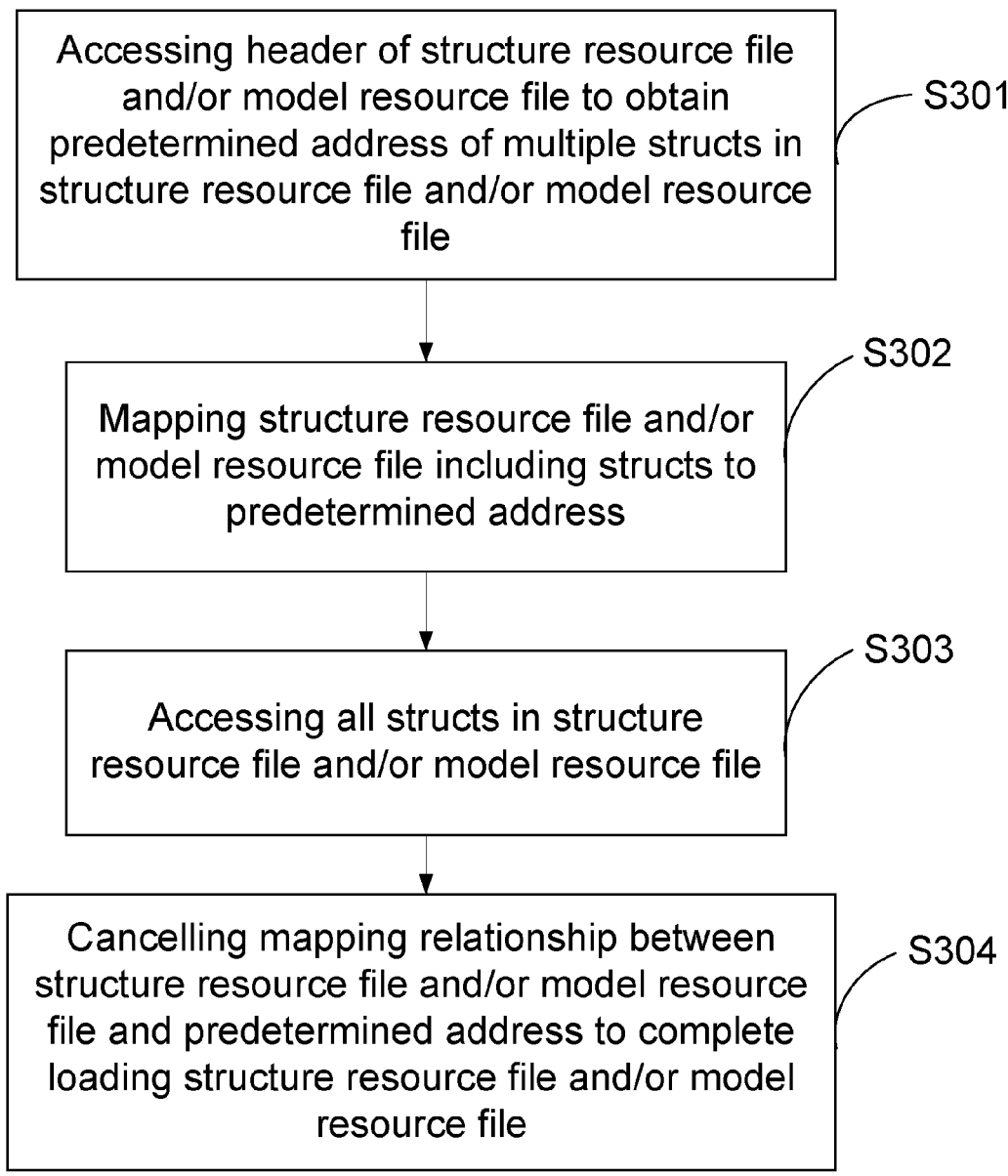
FIG. 2 is a flowchart of a method for loading a resource file for a game engine according to another embodiment of the present invention.

Referring to FIG. 2, the step of accessing at least one type of resource file between the structure resource file and the model resource file through memory mapping includes the following sub-steps.

In sub-step S301, a header of at least one of the structure resource file and the model resource file is accessed to obtain a predetermined address of all structs in the corresponding resource file.

The structs are small structures obtained by dividing at least one of the structure resource file and the model resource file, and have a consistent recording method as the game engine records corresponding resources in the memory.

In sub-step S302, the resource file including the structs is mapped to the predetermined address. That is, at least one of the structure resource file and the model resource file including the structs is mapped to the predetermined address.

In sub-step S303, all of the structs in the corresponding resource file are accessed. That is, all of the structs in at least one of the structure resource file and the model resource file are accessed.

In sub-step S304, a mapping relationship between at least one of the structure resource file and the model resource file including the structs and the predetermined address is cancelled to complete loading at least one of the structure resource file and the model resource file.

Figure 3:
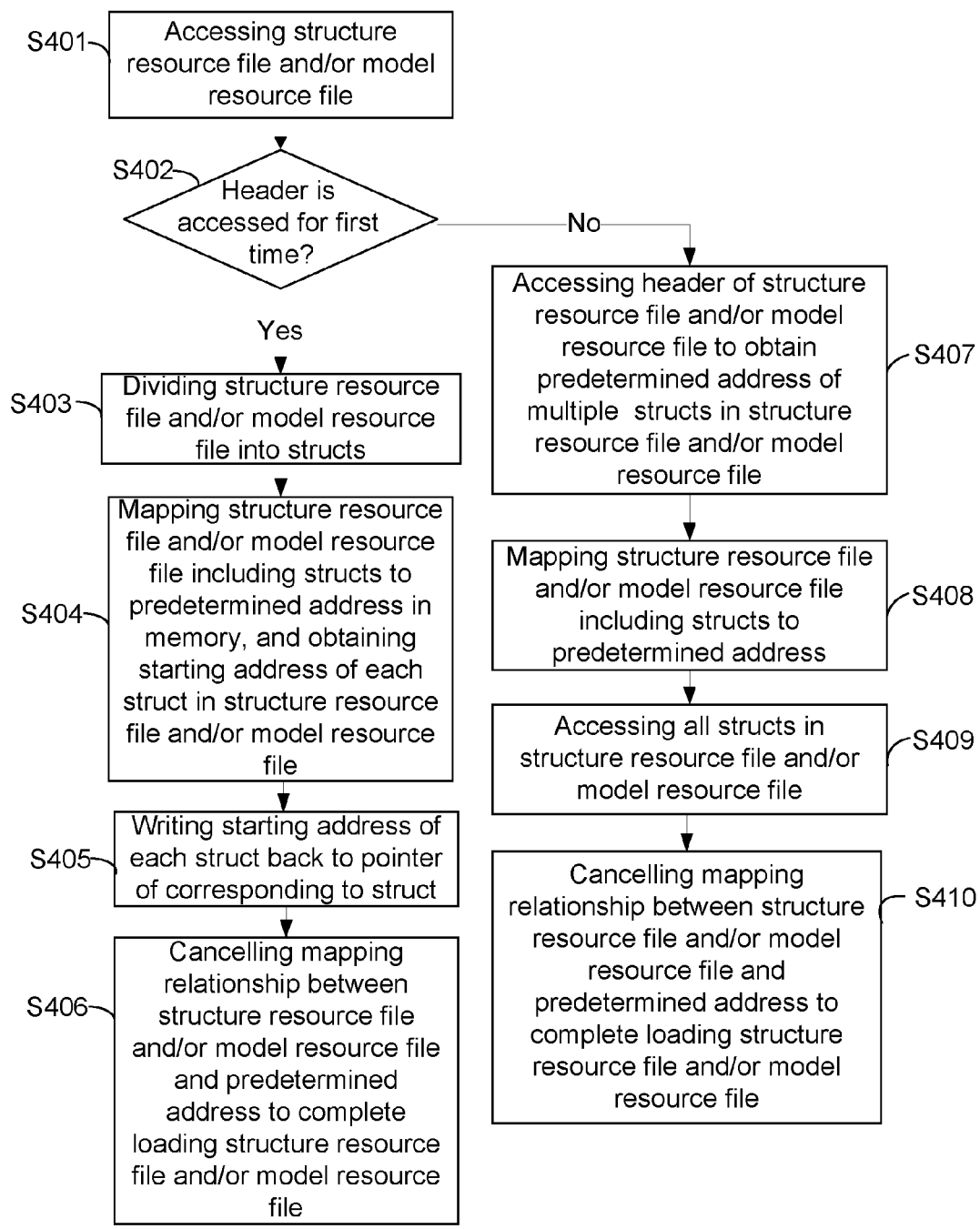
FIG. 3 is a flowchart of accessing and loading at least one of a structure resource file and a model resource file through memory mapping in a method for loading a resource file for a game engine according to an embodiment of the present invention.

The above approach for accessing at least one of the structure resource file and the model resource file is directed to accessing at least one of the structure resource file and the model resource file that is not accessed for the first time. When it cannot be determined that whether the corresponding access process is the first access, a corresponding loading process is described below with reference to FIG. 3.

In sub-step S401, at least one of the structure resource file and the model resource file is accessed.

In sub-step S402, it is determined whether the at least one of the structure resource file and the model resource file is accessed for the first time. If it is a first time access, sub-step S403 is performed, else sub-step S407 is performed.

In sub-step S403, the corresponding resource file is divided into structs. That is, the at least one of the structure resource file and the model resource file is divided into structs. The structs obtained have a consistent recording method as the game engine records the corresponding information in the memory, and also have a consistent arrangement structure in the resource file as a structure of the corresponding resources stored by the game engine in the memory.

In sub-step S404, the corresponding resource file including the structs is mapped to the predetermined address to obtain a starting address of each of the structs. That is, the at least one of the structure resource file and the model resource file including the structs is mapped to the predetermined address in the memory to obtain a starting address of each of the divided structs.

The starting address of a struct is a sum of a position shift value of the struct in the structure resource file or the model resource file and the predetermined address. Another appropriate address is searched for if the predetermined address is already occupied.

The starting address of a corresponding struct is the sum of the position shift value of the struct in the structure resource file or the model resource file, and the another appropriate address found if the predetermined address is already occupied. In a struct obtained from dividing the model resource file, a pointer in the structure points to a document buffer stored in the model resource file, and the starting position of a struct obtained from dividing the model resource file is the sum of the position shift value of the buffer of the struct in the model resource file and the predetermined address.

In sub-step S405, the starting address of each struct is written back to the pointer of the corresponding struct. That is, the predetermined address and the position shift level of each struct in the at least one of the structure resource file and the model resource file is written back to the pointer of the corresponding struct.

In sub-step S406, the mapping relationship between the corresponding resource file including the structs and the predetermined address is cancelled to complete loading of the resource file. More specifically, the mapping relationship between the at least one of the structure resource file and the model resource file including the structs and the predetermined address in the memory is cancelled to complete loading the at least one of the structure resource file and the model resource file.

In sub-step S407, the header of the at least one of the structure resource file and the model resource file is accessed to obtain the predetermined address of each of the structs of the corresponding resource file.

In sub-step S408, the resource file including the structs is mapped to the predetermined address.

In sub-step S409, all of the structs in the corresponding resource file are accessed.

In sub-step S410, the mapping relationship between the resource file including the structs and the predetermined address is cancelled to complete loading the resource file.

With the method for loading a resource file for a game engine according to an embodiment of the present invention, it is known that during a loading process, access performance of a file system is enhanced through preloading to fully utilize all resources in a software/hardware system to further effectively save a loading time. Further, a speed of accessing files is also accelerated for resource files through memory mapping. By combining the two approaches above, a speed of loading game resource files is significantly enhanced to thoroughly exercise computer resources.

Figure 4:
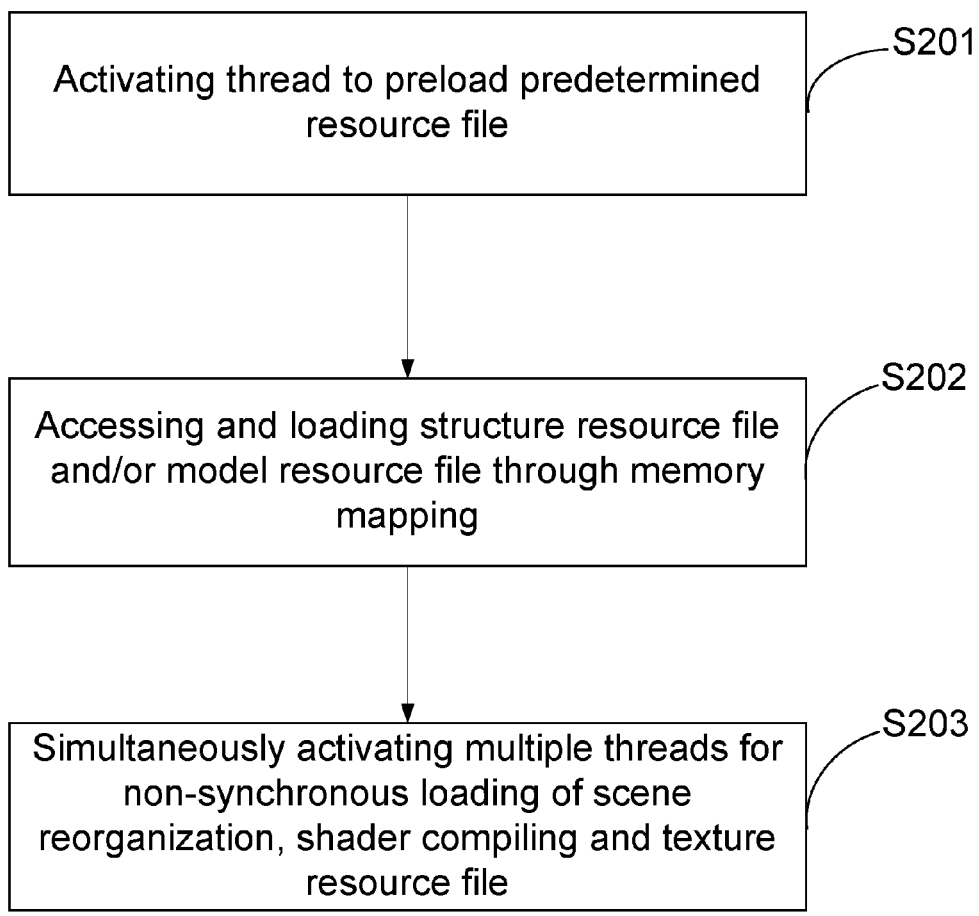
FIG. 4 is a flowchart of accessing and loading at least one of a structure resource file and a model resource file through memory mapping in a method for loading a resource file for a game engine according to another embodiment of the present invention.

FIG. 4 shows a flowchart of a method for loading a resource file for a game engine according to another preferred embodiment of the present invention. The method includes the following steps.

In step S201, a thread is activated to preload a predetermined resource file. While preloading a predetermined resource file, the CPU may perform initialization processes as preparations for accelerating a subsequent loading process of resource files and shader compiling. In one embodiment, all texture resource files, structure resource files, and model resource files may be preloaded.

In step S202, at least one of the structure resource file and the model resource file is accessed and loaded through memory mapping.

The method of accessing structure resource files or model resource files that are not large in size through memory mapping may not accelerate the loading speed of such files when the structure resource files and model resource files are loaded for the first time. However, in the first loading process, after removing the indices of all the structs obtained from dividing the corresponding resource file, each of the subsequent loading processes for such files can be accelerated given that the platform is not relocated or no drastic environmental changes occur.

After the first loading process, an analysis process can be eliminated since such type of files can be accessed by the game engine as accessing a memory. However, in the event of platform relocation or drastic changes in the operating environment, the corresponding first loading process needs to be again performed. With the antecedent preloading process, the loading process of the resource files can be accelerated. Details of accessing and loading the structure resource file or the model resource file through memory mapping can be referred from the above descriptions associated with FIG. 4, and shall be omitted herein for the sake of brevity.

In step S203, multiple threads are simultaneously activated to perform non-synchronous loading of scene reorganization, shader compiling and the texture resource file.

After completing steps S201 and S202, the CPU needs to reorganize the resources into a game engine for rendering and expression structures of scenes on one hand, and the game engine needs to prepare a texture resource and a shader compiler on the other hand.

3D scene reorganization and shader compiling are mainly performed by the CPU, and the loading of texture resources is mainly performed by a hardware decoder and a graphics engine processing unit (GPU). Hence, multiple threads may be simultaneously activated to perform multiple loading processes in parallel through non-synchronous loading. That is, the hardware decoder, GPU, and CPU are prompted to operate in parallel by activating multiple threads. When rendering of scenes is required, it is ensured that all associated resources are completely loaded through a synchronization mechanism.

Common texture resources are typically stored in a jpg format, which cannot be directly employed by a 3D hardware device and needs to be decompressed into a bitmap format in order to be utilized by the game engine. Such a process not only causes unnecessary waste in processing and memory but also significantly increases the loading time of resource files.

Therefore, certain compressible texture resources may be first compressed into compressed textures that can be directly employed by a 3D hardware device, usually into an ETC1 (Ericsson Texture Compression) or DXTn (S3 Texture Compression) format due to hardware restrictions. Meanwhile, such compressed textures are placed into a file system to reduce a file size and to effectively release more resources of the hardware decoder at the same time.

Further, the loading process of a shader by the game engine is also a more time-consuming process. An engine requires the CPU to compile a shader, whereas certain engines may even first need a runtime to generate a shader and then compile the shader, and so the CPU is given a greater burden during such process. Without considering cross-platform applications of games or user interfaces, the shader can be compiled at an offline status before software publish and then stored to the structure resource file, so as to accelerate the loading speed by eliminating the compiling process of the shader.

Figure 5:
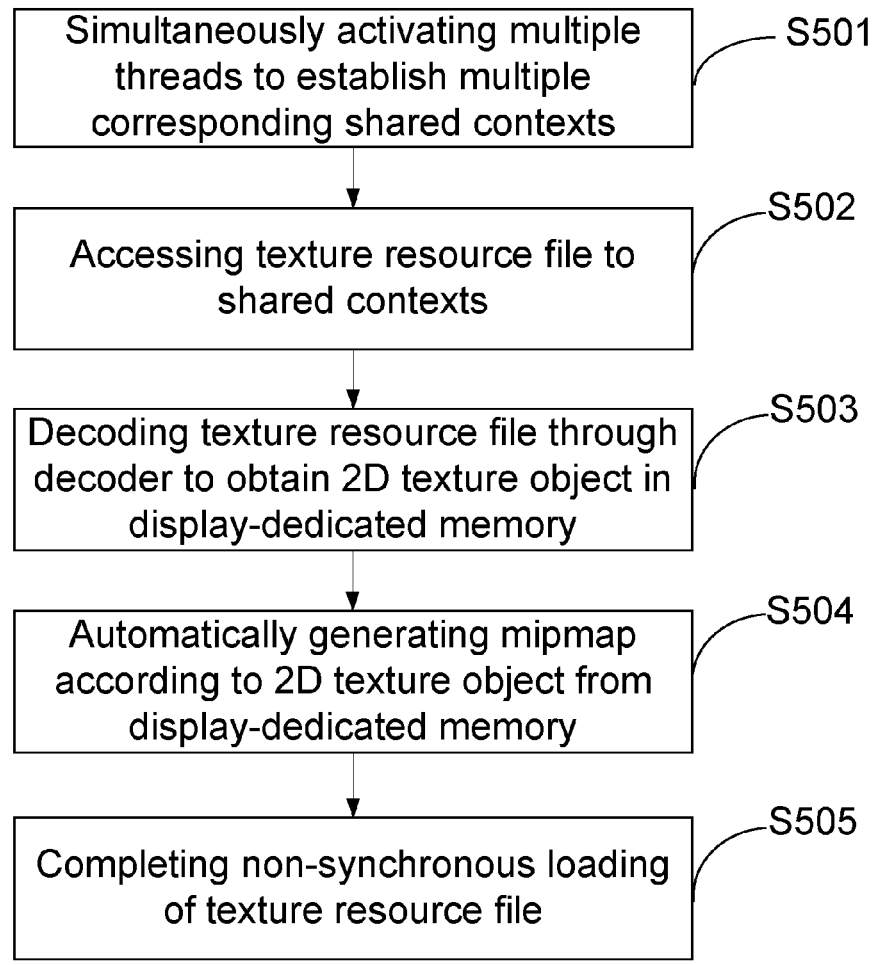
FIG. 5 is a flowchart of simultaneously activating multiple threads for non-synchronous loading of a texture resource file in a method for loading a resource file for a game engine according to an embodiment of the present invention.

Referring to FIG. 5, the step of simultaneously activating the multiple threads for non-synchronous loading of the texture file includes the following sub-steps.

In sub-step S501, the multiple threads are simultaneously activated to establish multiple corresponding shared contexts. By employing multiple shared contexts, an issue of a texture loading failure, caused by a platform and threads tied together in an Open Graphics Library (openGL) or Direct 3D (D3D) environment when multiple threads are activated for loading the texture resource file, can be solved.

In sub-step S502, the texture resource file is accessed to the shared contexts. Each of the shared contexts corresponds to one texture resource file, which includes compressed textures that can be directly utilized by a 3D hardware.

In sub-step S503, the texture resource file is decoded through a decoder to obtain a 2D texture object in a display-dedicated memory. The display-dedicated memory stores rendering data processed by a display chip to be later utilized. The texture resource file may be decoded through a hardware decoder or a software decoder. During the decoding process, it is first determined whether the hardware decoder is idle. If the hardware decoder is idle, the texture resource file is decoded through the hardware decoder to obtain the 2D texture object texImage2D. If the hardware decoder is not idle, the texture resource file is decoded through the software decoder to obtain the 2D texture object in the display-dedicated memory.

In sub-step S504, a mipmap is automatically generated according to the 2D texture object from the display-dedicated memory.

In sub-step S505, the loading of the texture resource file is completed.

Figure 6:
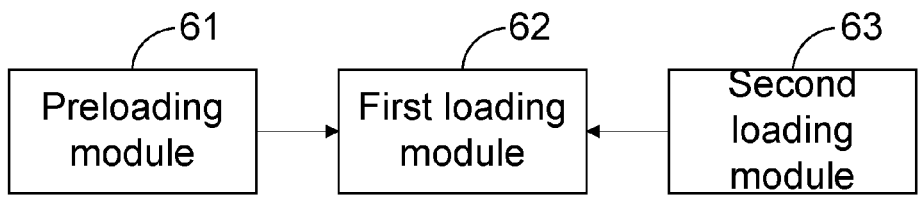
FIG. 6 is a block diagram of an apparatus for loading a resource file according to an embodiment of the present invention.

FIG. 6 shows a block diagram of an apparatus for loading a resource file according to an embodiment of the present invention. Referring to FIG. 6, the apparatus includes a preloading module 61 and a first loading module 62.

The preloading module 61 preloads a predetermined resource file by activating a thread. The predetermined resource file includes a texture resource file, and at least one of a structure resource and a model resource file. While preloading the predetermined resource file to a page cache by activating the thread, the preloading module 61 also prompts the CPU to perform initialization process such as loading a dynamic library, initializing background services, constructing scenes, and loading resources at another location, including but not limited to, the Internet, so as to accelerate the speed for scene reorganization and shader compiling.

The first loading module 62 accesses and loads at least one of the structure resource file and the model resource file preloaded by the preloading module 61 through memory mapping. The first loading module 62 chiefly serves for loading structure or model resource files.

Again referring to FIG. 6, in an alternative embodiment of the present invention, the apparatus for loading a resource file further includes a second loading module 63.

In this embodiment, after the first loading module 62 completes the corresponding loading process, the second loading module 63 simultaneously activates multiple threads for non-synchronous loading of scene reorganization, shader compiling, and the texture resource file. The second loading module 63 is capable of realizing and synchronously loading in parallel scene reorganization, shader compiling and the texture resource file. Without considering cross-platform applications of games or user interfaces, the second loading module 63 is also capable of compiling the shader at an offline status before software publish and then storing the compiled shader to the structure resource file, so as to accelerate the loading speed by eliminating the compiling process of the shader.

Figure 7:
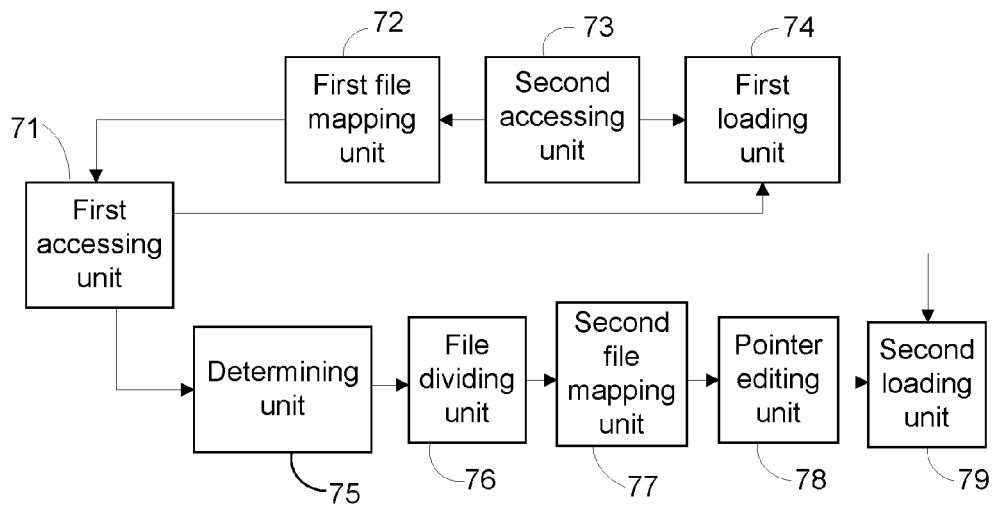
FIG. 7 is a block diagram of a first loading module in an apparatus for loading a resource file according to an embodiment of the present invention.

FIG. 7 shows a block diagram of a first loading module in an apparatus for loading a resource file according to an embodiment of the present invention. The first loading module includes a first accessing unit 71, a first file mapping unit 72, a second accessing unit 73, and a first loading unit 74.

The first accessing unit 71 accesses a header of at least one of the structure resource file and the model resource file preloaded by the preloading module to obtain a predetermined address of all structs in the at least one of the structure resource file and the model resource file. The structs are obtained from dividing the at least one of the structure resource file and the model resource file, and have a consistent recording method as the game engine records corresponding resources in a memory.

The first file mapping unit 72 maps the at least one of the structure resource file and the model resource file including the structs to the predetermined address obtained by the first accessing unit 71. According to the predetermined address obtained by the first accessing unit 71, the first file mapping unit 72 maps the structure or model resource file including the structs to the predetermined address, and notifies the second accessing unit 73 to perform a subsequent operation after completing the mapping process.

The second accessing unit 73 accesses all of the structs of the at least one of the structure resource file and the model resource file after the first file mapping unit 72 completes the mapping process. That is, the second accessing unit 73 accesses all of the structs in the corresponding resource file or the model resource file that are mapped, and notifies the first loading unit 74 to perform a subsequent operation after having accessed the structs.

The first loading unit 74 cancels the mapping relationship between the at least one of the structure resource file and the model resource file including the structs and the predetermined address after the second accessed unit 73 completes accessing all of the structs, so as to complete loading the at least one of the structure resource file and the model resource file.

Referring to FIG. 7, the first loading module includes a determining unit 75, a file dividing unit 76, a second file mapping unit 77, a pointer editing unit 78, and a second loading unit 79.

The determining unit 75 determines whether the header of the at least one of the structure resource file and the model resource file is accessed for the first time, and outputs a determination result. More specifically, the determining unit 75 determines whether the header accessed by the first accessing unit 71 is accessed for the first time, and notifies the first file mapping unit 72 or the file dividing unit 76 to perform a subsequent operation according to the determination result. That is, the determining unit 75 notifies the first file mapping unit 72 to perform a corresponding operation when the determination result indicates that the header is accessed for the first time, or else notifies the file dividing unit 76 to perform a corresponding operation when the determination result indicates that the header is not accessed for the first time.

When the determination result outputted by the determining unit 75 indicates that the header is accessed for the first time, the file dividing unit 76 divides the at least one of the structure resource file and the model resource file into structs. The structs obtained from dividing the corresponding resource file have a consistent recording method as the game engine records the corresponding resources in the memory.

The file dividing unit 76 divides the structure resource file or the model resource file into structs according to the notification from the determining unit 75. The file dividing unit 76 further renders the structs to have a consistent recording method as the game engine records the corresponding resources in the memory, and to have a consistent arrangement structure in the resource file as a structure of the corresponding resources stored by the game engine in the memory. The file dividing unit 76 then outputs the structs to the second file mapping unit 77.

The second file mapping unit 77 maps the at least one of the structure resource file and the model resource file including the structs to the predetermined address in the memory, and obtains a starting address of each of the structs in the at least one of the structure resource file and the model resource file.

The starting address of each of the structs is a sum of a position shift value of the struct in the structure resource file or the model resource file and the predetermined address.

When the predetermined address is occupied, the second file mapping unit 77 further automatically searches for another appropriate address, and maps the at least one of the structure resource file and the model resource file including the structs to the appropriate address found. When employing such approach, the starting address corresponding to each of the structs is the sum of the position shift value of the struct in the structure resource file or the model resource file and the appropriate address found.

After completing the mapping process, the second file mapping unit 77 obtains the starting address of each of the structs. In each of the structs obtained from dividing the model resource file, a pointer in the struct points to a document buffer stored in the file, and the starting position of each of the structs obtained from dividing the model resource file is the sum of the position shift value of the buffer of the struct in the model resource file and the predetermined address. The second file mapping unit 77 further outputs the starting address of each of the structs to the pointer editing unit 78.

The pointer editing unit 78 edits the pointers of the structs according to original addresses of the structs obtained by the second file mapping unit 77, and notifies the second loading unit 79 to perform a corresponding operation after completing editing the pointers.

After the pointer editing unit 78 completes editing the pointers of the structs, the second loading unit 79 cancels the mapping relationship between the at least one of the structure resource file and the model resource file including the structs and the predetermined address in the memory to complete loading the at least one of the structure resource file and the model resource file.

The second loading unit 79 completes loading the structure or model resource file through cancelling the mapping relationship between the corresponding file and the predetermined address.

Figure 8:
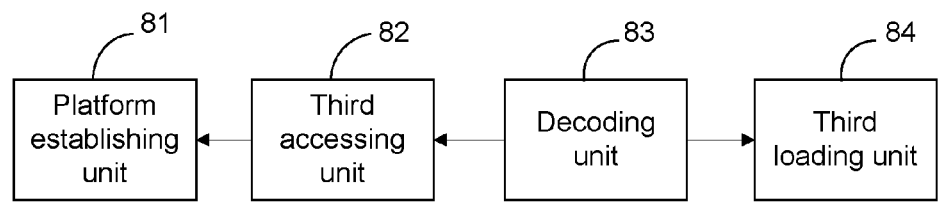
FIG. 8 is a block diagram of a second loading module in an apparatus for loading a resource file according to an embodiment of the present invention.

FIG. 8 shows a block diagram of a second loading module of an apparatus for loading a resource file according to an embodiment of the present invention.

Referring to FIG. 8, the second loading module includes a platform establishing unit 81, a third accessing unit 82, a decoding unit 83, and a third loading unit 84.

The platform establishing unit 81 simultaneously activates multiple threads to establish corresponding shared contexts. Each of the threads correspondingly establishes one shared context. By employing the multiple shared contexts, an issue of a texture loading failure, caused by a platform and threads tied together in an openGL or D3D environment when multiple threads are activated for loading the texture resource file, can be solved.

The third accessing unit 82 accesses the texture resource file to the shared contexts. The third accessing unit 83 may simultaneously access multiple texture resource files to the shared contexts, with each of the shared contexts corresponding to one among of the texture resource files. Further, the accessed texture resource file includes compressed texture information that can be directly utilized by a 3D hardware.

The decoding unit 83 decodes the texture resource file to obtain a 2D texture object (e.g., texImage2D) in a display-dedicated memory. The decoding unit 83 may simultaneously decode multiple texture resource files, and output the 2D texture object from the display-dedicated object to the third loading unit 84.

The third loading unit 84 automatically generates a mipmap according to the 2D texture object from the display-dedicated memory to complete non-synchronous loading of the texture resource file. More specifically, the third loading unit 84 automatically generates a mipmap according to the 2D texture object outputted by the decoding unit 83.

A computer is provided according to another embodiment of the present invention. The computer includes the apparatus for loading a resource file described in the above embodiments.

Thus, the method, apparatus, and computer for loading a resource file disclosed by the present invention are capable of accelerating read/write performance of a file system through preloading. Further, the above approach is jointly adopted with memory mapping to optimize structure and model resource files, thereby significantly increasing a speed of loading resource files for a game engine.

Meanwhile, by compressing the texture resource file and employing non-synchronous loading through multiple threads, multiple threads are activated for shader compiling and scene reorganization at the same time when loading the texture resource file, the CPU, GPU, hardware decoder, and file access are rendered to operate in full load. As such, during the loading process of all the resource files, all resource files in hardware and software systems are fully utilized to significantly accelerate a speed of loading game resource files and thoroughly exercise computer resources.

An experiment of implementing the method for loading a resource file for a game engine disclosed by the present invention is carried out on a dual-core CPU platform. An original loading process requires about 9 to 10 seconds, whereas the method for loading a resource file for a game engine according to an embodiment of the present invention requires only 2.5 seconds. It is apparent that the method for loading a resource file for a game engine disclosed by the present invention remarkably increases the speed of loading resource files.

It should be noted that, details of the apparatus and method disclosed by the present invention are not limited to the described examples in the foregoing embodiments, and may be implemented through other means. The modules and units are defined according to logic functions, and other definition methods for the modules and units may be implemented in other applications. For example, multiple units or components may be combined or integrated to another system, or certain characteristics may be omitted or left unexecuted. Further, the coupling, direct coupling, or communication coupling in the discussions may be implemented through certain interfaces, indirect coupling between units, communication, electrical or mechanical connections, or connections of other forms.

The units described as discrete components may or may not be physically separate. Further, the components and units displayed may be non-physical units; that is, the components and units may be disposed at a physical location or distributed on multiple network units. According to actual requirements, all or a part of the components and units may be adopted for implementing the embodiments of the present invention.

Further, the functional units in the foregoing embodiments may be combined into one processing unit, physically exist as individual units, or be integrated into one unit with at least one other unit. The integrated units may be realized through hardware, through software, or an arbitrary combination of both.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for loading a resource file for a game engine, comprising:
   activating a thread to preload a predetermined resource file, wherein the predetermined resource file comprises a texture resource file and one or both of a structure resource file and a model resource file; and
   accessing a header of one or both of the structure resource file and the model resource file to obtain a predetermined address of a plurality of structs in one or both of the structure resource file and the model resource file, wherein the structs are obtained from dividing one or both of the structure resource file and the model resource file and have a consistent recording method as the game engine records corresponding resources in a memory;
   mapping one or both of the structure resource file and the model resource file comprising the structs to the predetermined address;
   accessing all of the structs in one or both of the structure resource file and the model resource file after having mapped to the predetermined address; and
   cancelling a mapping relationship between one or both of the structure resource file and the model resource file comprising the structs and the predetermined address after having accessed all of the structs in one or both of the structure resource file and the model resource file to complete loading one or both of the structure resource file and the model resource file.

2. The method according to claim 1, further comprising:
   determining whether the header of one or both of the structure resource file and the model resource file is accessed for a first time;
   if the header of one or both of the structure resource file and the model resource file is not accessed for the first time, performing the step of accessing one or both of the header of the structure resource file and the model resource file and subsequent steps until having completely loaded one or both of the structure resource file and the model resource file;
   if the header of one or both of the structure resource file and the model resource file is accessed for the first time, dividing one or both of the structure resource file and the model resource file into structs, wherein the structs have a consistent recording method as the game engine records the corresponding resources in the memory;
   mapping one or both of the structure resource file and the model resource file comprising the structs to a predetermined address in the memory, such that a starting address of each of the structs in one or both of the structure resource file and the model resource file is a sum of a location shift value of the struct in one or both of the structure resource file and the model resource file and the predetermined address;
   if the predetermined address is occupied, searching for one other address such that the starting address of each corresponding struct is a sum of the location shift value of the struct in one or both of the structure resource file and the model resource file and the one other address;
   writing the predetermined address and the location shift value of each of the structs in one or both of the structure resource file and the model resource file back to a pointer corresponding to the struct; and
   cancelling the mapping relationship between one or both of the structure resource file and the model resource file and the predetermined address in the memory after having written the pointers of all of the structs to complete loading one or both of the structure resource file and the model resource file.

3. The method according to claim 1, further comprising:
   simultaneously activating a plurality of threads for non-synchronous loading of scene reorganization, shader compiling, and the texture resource file.

4. The method according to claim 3, wherein the step of simultaneously activating the threads for the non-synchronous loading of the texture resource file comprises:
   simultaneously activating the threads to establish multiple corresponding shared contexts;
   accessing the texture resource file to the shared contexts;
   decoding the texture resource file through a decoder to obtain a 2D texture object in a display-dedicated memory;
   automatically generating a mipmap according to the 2D texture object from the display-dedicated memory; and
   completing the non-synchronous loading of the texture resource file.

5. The method according to claim 4, wherein the step of accessing the texture resource to the shared contexts comprises:
   simultaneously accessing at least two texture files to the shared contexts, wherein each of the shared contexts corresponds to one of the texture resource files, and the resource files comprise compressed texture information that can be directly utilized by a 3D hardware device.

6. The method according to claim 4, wherein the step of decoding the texture resource file through the decoder to obtain the 2D texture object in the display-dedicated memory comprises:
   determining whether a hardware decoder is idle;
   decoding the texture resource file through the hardware decoder when the hardware decoder is idle to obtain the 2D object in the display-dedicated memory; and
   decoding the texture resource file through a software decoder when the hardware decoder is not idle to obtain the 2D object in the display-dedicated memory.

7. The method according to claim 3, wherein the step of activating the thread to preload the predetermined resource file comprises:
   activating the thread to preload the predetermined resource file to a page cache, and simultaneously initializing a CPU to accelerate a speed of the scene reorganization and shader compiling.

8. The method according to claim 7, wherein the step of initializing the CPU to accelerate the speed of the scene reorganization and shader compiling comprises:
   rendering the CPU to load a dynamic library, initialize a background service, construct scenes and loading the Internet to accelerate the speed of the scene reorganization and shader compiling.

9. The method according to claim 3, wherein the step of performing shader compiling comprises:
   completing shader compiling in an offline status before software publish and storing a compiled shader to the structure resource file.

10. An apparatus for loading a resource file, comprising:
    a preloading module, for activating a thread to preload a predetermined resource file, wherein the predetermined resource file comprises a texture resource file and one or both of a structure resource file and a model resource file;

a first loading module, for accessing and loading one or both of the structure resource file and the model resource file through memory mapping; and a second loading module, for simultaneously activating a plurality of threads for non-synchronous loading of scene reorganization, shader compiling, and the texture resource file, comprising:

a platform establishing unit, for simultaneously activating the threads to establish a plurality of corresponding shared contexts;

a third accessing unit, for accessing the texture resource file to the shared contexts;

a decoding unit, for decoding the texture resource file through a decoder to obtain a 2D texture object in a display-dedicated memory; and a third loading unit, for automatically generating a mipmap according to the 2D texture object from the display-dedicated memory to complete the non-synchronous loading of the texture resource file.

11. The apparatus according to claim 10, wherein the first loading module comprises:

a first accessing unit, for accessing a header of one or both of the structure resource file and the model resource file to obtain a predetermined address of a plurality of structs in one or both of the structure resource file and the model resource file, wherein the structs are obtained from dividing one or both of the structure resource file and the model resource file and have a consistent recording method as a game engine records corresponding resources in a memory;

a first file mapping unit, for mapping one or both of the structure resource file and the model resource file comprising the structs to the predetermined address;

a second accessing unit, for accessing all of the structs in one or both of the structure resource file and the model resource file after having mapped to the predetermined address; and a first loading unit, for cancelling a mapping relationship between one or both of the structure resource file and the model resource file comprising the structs and the predetermined address after having accessed all of the structs in one or both of the structure resource file and the model resource file to complete loading one or both of the structure resource file and the model resource file.

12. The apparatus according to claim 11, wherein the first loading module comprises:

a determining module, for determining whether the header of one or both of the structure resource file and the model resource file is accessed for a first time to output a determination result;

a file dividing unit, for dividing one or both of the structure resource file and the model resource file into structs when the determination result indicates that the header is accessed for the first time, wherein the structs have a consistent recording method as the game engine records the corresponding resources in the memory;

a second file mapping unit, for mapping one or both of the structure resource file and the model resource file comprising the structs to a predetermined address in the memory, and obtaining a starting address of each of the structs in one or both of the structure resource file and the model resource file, wherein a starting address of each of the structs in one or both of the structure resource file and the model resource file is a sum of a location shift value of the struct in one or both of the structure resource file and the model resource file and the predetermined address;

a pointer editing unit, for writing the predetermined address and the location shift value of each of the structs in one or both of the structure resource file and the model resource file back to a pointer corresponding to the struct; and a second loading unit, for cancelling the mapping relationship between one or both of the structure resource file and the model resource file and the predetermined address in the memory after having written the pointers of all of the structs to complete loading one or both of the structure resource file and the model resource file.

13. The apparatus according to claim 10, wherein the third accessing unit accesses at least two texture files to the shared contexts, wherein each of the shared contexts corresponds to one of the texture resource files.

14. The apparatus according to claim 10, wherein the preloading module activates the thread to preload the predetermined resource file to a page cache, and simultaneously initializes a CPU to accelerate a speed of the scene reorganization and shader compiling.

15. A non-transitory computer-readable medium with an executable program stored thereon, wherein the executable program instructs a microprocessor to perform steps:

activating a thread to preload a predetermined resource file, wherein the predetermined resource file comprises a texture resource file and one or both of a structure resource file and a model resource file; and accessing and loading one or both of the structure resource file and the model resource file through memory mapping;

simultaneously activating the threads for non-synchronous loading of scene reorganization, shader compiling, and the texture resource file to establish multiple corresponding shared contexts;

accessing the texture resource file to the shared contexts;

decoding the texture resource file through a decoder to obtain a 2D texture object in a display-dedicated memory;

automatically generating a mipmap according to the 2D texture object from the display-dedicated memory; and completing the non-synchronous loading of the texture resource file.

* * * * *